March 18, 1947.   P. D. WURZBURGER   2,417,536
PIPE COUPLING
Filed Sept. 27, 1944

INVENTOR.
PAUL D. WURZBURGER
BY
John C. Kerr
ATTORNEY

Patented Mar. 18, 1947

2,417,536

UNITED STATES PATENT OFFICE 2,417,536

PIPE COUPLING

Paul D. Wurzburger, Cleveland, Ohio

Application September 27, 1944, Serial No. 556,005

2 Claims. (Cl. 285—122)

My present invention relates to a coupling for pipes or tubes wherein an unthreaded end of a pipe or tube is coupled to the body member of a coupling by a joint which is hydraulically and mechanically adequate.

Couplings of the general type of the present invention are known as "Ermeto" couplings and are disclosed for example in United States Patents 2,139,413, granted December 6, 1938, 2,171,217 granted August 29, 1939, 2,201,404 granted May 21, 1940, and 2,211,856 granted August 20, 1940.

A characteristic of couplings of this type is that there is an annular packing member or sleeve having a sharp inner cutting edge at or adjacent to the forward end thereof, which is caused to bite or cut into the pipe by relative movement in respect to the body member of the coupling, the inside of which is formed as a flaring mouth and which has a camming action constricting the forward end portion of the packing member, so that the sharp inner forward edge will bite or cut into the pipe. As a further grip on the pipe, couplings of this type are adapted to have means by which the rear portion of the packing member is compressed into gripping engagement with the pipe. This is accomplished as shown in the patents above referred to by providing an inclined surface within the nut, which is used for causing axial movement of the packing member and which is usually threaded onto the body member, engaging a more or less complementary surface on the rear portion of the packing member and forcing this rear portion into gripping engagement with the pipe.

A difficulty has arisen in that it is almost impossible in ordinary manufacturing operations to form a packing member which does not have a fairly sharp rear inner edge or has burrs thereon left from the machining operations by which the packing member was made, so that when the rear portion is constricted by the inclined surface within the nut, the rear inner edge often bites into the pipe. Therefore, instead of having merely a gripping engagement with the pipe by the rear portion of the packing member, there is actually a biting engagement, which is undesired at this point. In the first place, it has no desired functional advantage in holding the pipe to the coupling or to the body member thereof as the relative angles of biting contacts are in the wrong direction. In the second place, in some instances where the pipe or the coupling to which it is engaged by the means of this type have a relative vibratory movement, such for example as an oil pipe for an airplane engine which is coupled to a coupling body member on the engine, there tends to be a failure of the pipe at the rear portion of the packing member due to the fact that when this rear inner edge bites into the pipe at this point, the vibratory strains are concentrated adjacent to this point along the pipe, sometimes causing failure as by metal fatigue.

A principal object of the present invention is therefore, to prevent any biting engagement by the rear portion of the packing member with the pipe at this point so that any vibratory strains on the pipe will be distributed along a substantial length thereof rather than being concentrated at a particular transverse plane of the pipe.

A further and more specific object of the invention is to provide the desired gripping engagement between the rear portion of the packing member and the pipe extending over a substantial area of both while specifically preventing cutting engagement between the rear, relatively sharp inner edge of the packing member and the pipe, particularly by causing such a distortion of the packing member as will tend to move the relatively sharp rear inner edge thereof away from the pipe, while causing the rear portion of the packing member to move into gripping engagement with the pipe.

While the present invention is peculiarly adaptable in connection with "Ermeto" fittings as above set forth, it is also useful in other types of fittings, for example, those where compression alone as distinguished from a cutting action is relied upon to hold the pipe in the fitting.

While the features of the present invention may be adequately obtained by using a packing member which is not interchangeable end-for-end, it has been found that assembly is greatly simplified if the packing member may be assembled in interchangeable end-for-end positions. It is, therefore, a further specific object of the present invention to provide a packing member, which will be interchangeable end-for-end, while retaining the advantages hereinabove generally referred to.

Other objects and advantages of the present invention will become apparent from the following specification and appended claims when taken in connection with the accompanying drawings in which:

Turning now particularly to the drawings, there is shown a body member B of the coupling, which may be formed as shown or in any other conventional way and which is adapted to have threaded thereon a conventional nut N through which an unthreaded pipe or tube P enters in the usual manner. The end of the pipe P is adapted to engage against the shoulder 1 in the body member, as shown.

Figure 1:
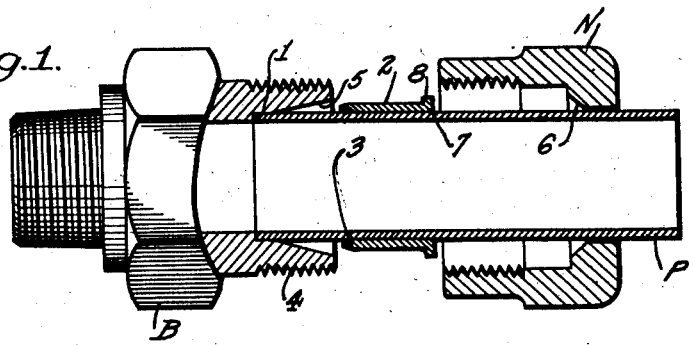
Figure 1 is a view partly in elevation and partly in central transverse section of the parts of a coupling embodying the present invention prior to the completion of the coupling.
Figure 2:
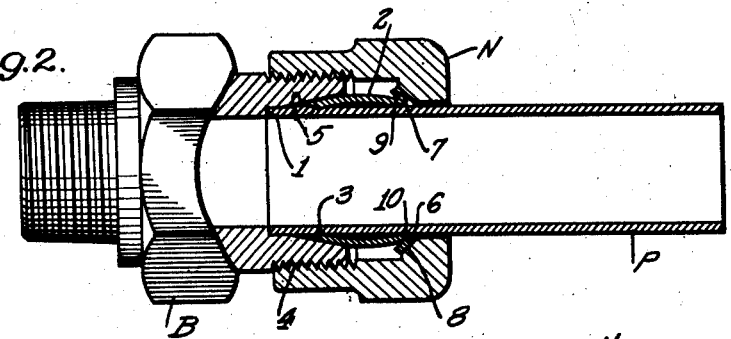
Fig. 2 is a similar view after the coupling has been completed.

Surrounding the pipe P is a packing member or sleeve 2, Figs. 1 and 2, which is of material harder than that of the pipe P and which has a forward inner cutting edge 3 adapted to bite or cut into the pipe, as shown in Fig. 2, upon axial movement of the packing member caused by tightening the nut N onto threads 4 of the body member. The body member has a flaring mouth 5, which is arranged to engage the forward end of the packing member 2 and constrict the end portion thereof to cause the cutting edge 3 to bite into the pipe. All this is substantially the same as corresponding subject matter described in the patents above referred to.

It is desired not only that the edge 3 cut into pipe P and hold it in its coupled position, as shown in Fig. 2, in respect to the body member B, but also that the rear portion of the packing member 2 be brought into gripping engagement with a portion of the pipe P. For this purpose it has been conventional in the prior art, as disclosed by the patents above referred to, to form within the nut N an inclined surface as shown at 6. With packing members as shown in these patents, however, an undesirable condition sometimes obtained in that the rear inner edge 7 of the packing member was forced into engagement, sometimes actual cutting engagement, with the pipe P. The present invention seeks to overcome this difficulty. For this purpose the rear end of the packing member 2 is provided with an outwardly extending flange 8, which is directly engaged by the inclined surface 6 and is folded or rolled over as shown at 9, Fig. 2. This results in desirable features inherent from the present invention. First, the rear portion 10 of the packing member is forced into gripping engagement with the pipe, as shown in Fig. 2, and second, the edge 7 is now moved away from the engagement with the pipe by the rolling over action on the flange 8, thus positively preventing any cutting action on the pipe at this point or transverse plane of the pipe. This in turn prevents any strains due to vibration of the pipe in respect to the body or vice versa being transmitted to a single transverse plane of the pipe and distributes them over a substantial area, being the area of contact indicated at 10 between the rear portion of the packing member and the pipe. In practice this results in preventing failure of the pipe.

Figure 3:
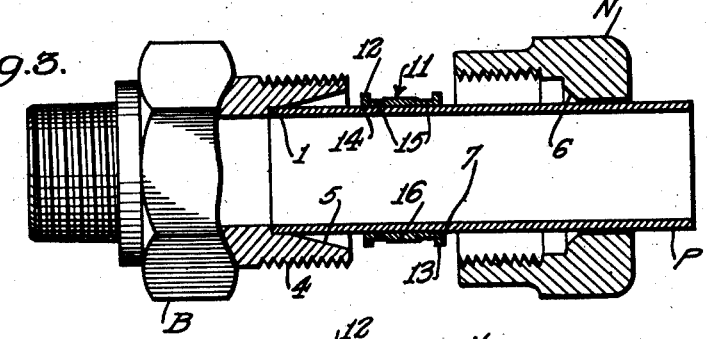
Fig. 3 is a view similar to Fig. 1 showing a modified form of packing member.
Figure 4:
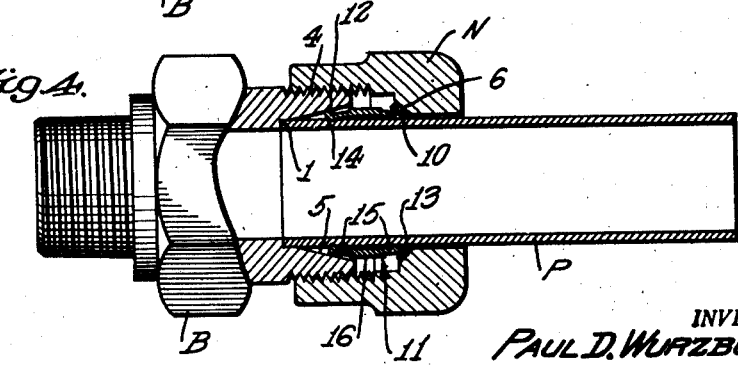
Fig. 4 is a similar view showing the modification of Fig. 3 with the coupling completed.

In Figs. 3 and 4 there is shown a modified form of packing member generally indicated at 11, which is symmetrical end-for-end, so as to be interchangeably assembled in either position. This is much simpler for the assembler, as inexperienced persons assembling the fittings sometimes insert them in the wrong direction, which may, in some instances, tend to defeat the attainment of the desired results. As shown, the packing member 11 has flanges 12 and 13 at the forward and rear ends thereof respectively and has its forward inner edge 14 operating as the cutting edge, as best shown in Fig. 4. The flaring mouth 5 of the body member B now contacts the outer peripheral surface of the flange 12 upon the completion of the coupling by tightening the nut N on the body member B, forcing the parts to the position shown in Fig. 4. It will be seen that at this position the pipe P is held securely against the shoulder 1 and is prevented from dislodgement by the biting action of the cutting edge 14 therein. The flange 13 operates in exactly the same manner previously described for the flange 8, so that there will be a gripping engagement at 10 between the rear portion of the packing member and the pipe as previously described, while the rear inner edge 7 is drawn away from the pipe P by the rolling over action of the flange 13 by the inclined surface 6 of the nut N.

If desired the packing member could be made of uniform cross-section intermediate the peripheral flanges. I have shown however, relatively weakened sections 15 for the packing member contiguous with the flange end portions thereof and a central relatively thicker portion 16. This permits a yielding of the portion 15 at its junction with the rear flange 13, as shown in Figs. 4 and 5, which may be desirable in certain circumstances.

It will be seen that by the provisions just described I am enabled to secure all the advantages of the previously known devices, while eliminating certain of the known disadvantages thereof, particularly the tendency for the rear relatively sharp inner edge of the packing member cutting into the pipe.

While there is shown and described but two modifications of my present invention, it is to be understood that further embodiments may be made thereof as will be obvious to those skilled in the art and without departing from the spirit of the invention as set forth in the appended claims, which are to be construed validly as broadly as the state of the art permits.

What is claimed is:

1. A coupling for a pipe, comprising a body member having a flaring mouth and to which a pipe is to be coupled, a packing member arranged to surround the pipe in its operative position, said packing member having a forward end portion cooperating with the flaring mouth of said body member to constrict such forward end portion, said packing member also having a rear inner sharp edge portion formed at the juncture of the inner surface thereof with the rear end surface formed incident to the machining thereof and having an outwardly extending flange at its rear end, one surface of which is formed as said rear end surface, and means cooperating with said body member for forcing said packing member axially of said pipe, the last named means having a portion adapted to engage said outwardly extending flange of said packing member and roll it over toward the forward end thereof, so as to move said rear inner sharp edge portion away from said pipe on the completion of the coupling, while forcing the rear portion of the packing member into gripping engagement with said pipe.

2. A coupling for a pipe, comprising a packing member of material harder than the pipe and adapted to be positioned concentrically therearound, said packing member having sharp forward and rear inner edges, one of which is adapted for biting engagement with said pipe and having similar outwardly extending flanges at both ends thereof, said sharp inner edges being formed incident to the machining thereof, at the juncture of the end surfaces of said flanges and the inner surface of said packing member, reduced thickness portions next adjacent to said ends and a relatively thicker central portion, said packing member being symmetrical about its midpoint in an axial direction so as to be interchangeable end-for-end, a body member having a flaring mouth portion constructed and arranged to coact with the outwardly extending flange at the forward end of said packing member to compress and constrict such forward end portion thereof so that the sharp forward inner edge will bite into said pipe upon axial movement of said packing member toward and into said flaring mouth portion, and means cooperating with said body member for causing axial movement of said packing member to force the sharp forward inner edge into biting engagement with said pipe, the last named means having an inclined surface for engaging and rolling over the outwardly extending flange at the rear of said packing member so as to force the rear portion of said packing member into gripping engagement with said pipe and simultaneously to move the sharp rear inner edge of said packing member outwardly from said pipe incident to the rolling operation of said flange, the reduced diameter portion of said packing member adjacent to this rear flange yielding upon this rolling-over operation.

PAUL D. WURZBURGER.

REFERENCES CITED

The following references are of record in the file of this patent:

UNITED STATES PATENTS

| Number | Name | Date |
|---|---|---|
| 2,171,217 | Kreidel | Aug. 29, 1939 |
| 1,489,065 | Clifton | Apr. 1, 1924 |
| 1,904,866 | Kreidel | Apr. 18, 1933 |

FOREIGN PATENTS

| Number | Country | Date |
|---|---|---|
| 540,088 | British | Oct. 6, 1941 |